United States Patent [19]

Spears

[11] Patent Number: 5,109,929
[45] Date of Patent: May 5, 1992

[54] SPRINKLER HEAD ADAPTER

[75] Inventor: Robert W. Spears, Agua Dulce, Calif.

[73] Assignee: Spears Manufacturing Corp., Sylmar, Calif.

[21] Appl. No.: 579,306

[22] Filed: Sep. 7, 1990

[51] Int. Cl.$^5$ ............................................. A62C 35/00
[52] U.S. Cl. ........................................ 169/16; 169/37; 285/174
[58] Field of Search ..................... 169/37, 16; 285/174, 285/349, 355, 357

[56] References Cited

U.S. PATENT DOCUMENTS

| | | | |
|---|---|---|---|
| 1,066,214 | 7/1913 | Mulconroy et al. | 285/174 X |
| 2,267,716 | 12/1941 | Boynton | 285/349 X |
| 2,425,817 | 8/1947 | Mosca. | |
| 2,437,843 | 3/1948 | Ness. | |
| 2,456,418 | 12/1948 | Immerman. | |
| 2,461,516 | 2/1949 | Bullock. | |
| 2,493,996 | 1/1950 | Parmesan | 285/349 X |
| 2,521,701 | 9/1950 | Earle et al. | 285/349 X |
| 2,702,201 | 2/1955 | Romanelli et al. | |
| 2,776,151 | 1/1957 | Harkenrider | 285/174 X |
| 3,236,543 | 2/1966 | Mueller | 285/174 X |
| 3,348,862 | 10/1967 | Leopold et al. | 285/174 X |
| 4,128,128 | 12/1978 | Mears | 169/37 |
| 4,586,733 | 5/1986 | Anderson, Jr. . | |
| 4,905,766 | 3/1990 | Dietz et al. . | |

Primary Examiner—Margaret A. Focarino
Assistant Examiner—Gary C. Hoge
Attorney, Agent, or Firm—Jeffrey G. Sheldon

[57] ABSTRACT

A sprinkler head adapter comprising an internally threaded plastic fitting, a metal insert with both internal and external threads, and a sealing gasket is disclosed. The internally threaded passageway of the insert tapers inwardly. The diameters of the internally threaded fitting and of the externally threaded insert are substantially constant. The threads of the fitting and the corresponding external threads of the insert can be straight threads. The internal threads of the insert can be tapered threads corresponding to the threads of a metallic sprinkler head.

13 Claims, 1 Drawing Sheet

SPRINKLER HEAD ADAPTER

BACKGROUND

The present invention is directed to an adapter for achieving a leak-free connection between a plastic pipe and a metallic conduit such as a sprinkler head.

A sprinkler system is usually made of many plastic pipes running from a source of fire retardant such as water and terminating in metallic sprinkler heads at various locations in a building. The water is maintained in the system under pressure so that when ambient temperature rises sufficiently to, for example, melt a specially formulated material blocking the end of the sprinkler head, water is released through the sprinkler head.

A sprinkler system uses an adapter for connecting the plastic pipe to the metal sprinkler head. A prior art adapter comprised an internally threaded and tapered plastic fitting. A correspondingly threaded and tapered metal sprinkler head was screwed into the threaded, tapered end of the fitting. The plastic pipe was adhesively secured in the other end of the fitting.

With this prior art adapter the threaded connection between the metal sprinkler head and the plastic fitting was subject to attack and deterioration by the adhesive used to secure the plastic pipe to the fitting. Additionally, cracks appeared in the fitting due to a wedging action of the tapered sprinkler head if over tightened in the tapered fitting bore. The deterioration and cracks resulted in water leakage from the adapter.

An attempt to address these problems resulted in another prior art adapter with which the sprinkler head is not screwed directly into the plastic fitting. Instead a metal insert is first inserted into the plastic fitting and the sprinkler head is then screwed into the metal insert. A gasket or O-ring is placed between the insert and the fitting. Such an adapter is shown in U.S. Pat. No. 4,905,766. Here, the metal insert is held in place in the plastic fitting by matching elongated teeth on the outer surface of the insert and on inner surface of the fitting. The insert can also be held in the fitting by being roll formed, that is by crimping the insert against an annulus within the bore of the fitting.

The adapter shown in U.S. Pat. No. 4,905,766 is less than satisfactory for a number of reasons. First, water leakage can still occur, particularly if the roll form step is omitted or carried out improperly. The metal insert can then be expelled from the plastic fitting when water pressure is established in the sprinkler system. Water leakage can occur even if the roll form step is carried out because this step causes an outward compression of the metal insert onto the plastic fitting, and the compression can crack the fitting.

Second, the metal insert cannot be inserted on site, making testing of the integrity of the adapter prior to establishment of the final water pressure in the sprinkler system essentially impossible. Third, the metal insert is not easily replaceable should the insert begin to leak or show other signs of deterioration.

Fourth, the gasket is not replaceable. Replacement of the gasket can become important if the gasket begins to break apart and loose its sealant capability. The gasket can begin to break apart due to the action of the adhesive used to attach the plastic pipe to the fitting and due to the effect of long term exposure of the water in the sprinkler system.

Fifth, the adapter can be expensive to make due to at least the presence of a complex set of elongated teeth on the fitting and on the insert, and by requiring a roll form step. The roll form step necessitates an additional machine or tool to prepare the adapter for use.

Thus, there is a need for an adapter that: (a) provides an essentially leak-free connection of plastic to metal even after long usage; (b) has a metal insert that can be inserted on site; (c) has a metal inset that is replaceable; (d) has a replaceable gasket; and (e) that can be made relatively inexpensively.

SUMMARY

An adapter embodying features of the present invention satisfies this need.

The adapter is used to connect a threaded metallic component to a fluid carrying plastic pipe. The adapter is particularly well suited for connecting a metallic sprinkler head such as a fire sprinkler nozzle to the plastic piping used to carry a fire retardant such as water under pressure.

The adapter in accordance with the present invention has three parts, a plastic fitting, a metal insert and a gasket. The plastic fitting has a bore extending axially from a first end to a second end of the fitting. At least part of the bore of the fitting is threaded. Additionally, the diameter of the threaded bore is substantially constant. The bore of the fitting can have a grooved annulus for holding the gasket.

The metal insert has a bore or passageway extending axially from a first opening to a second opening of the insert. At least part of the passageway is threaded. The threaded passageway of the insert tapers radially inwardly in a direction from the first to the second opening of the insert. At least part of the external surface of the insert is threaded with threads corresponding to the threads of the fitting. Additionally, the diameter of the externally threaded part of the insert is substantially constant. Furthermore, there is a stop flange adjacent the external threads of the insert.

The gasket is positioned in the bore of the fitting between an end wall of the second opening of the insert and the fitting, to help maintain the fluid sealant characteristics of the adapter. The gasket can be an O-ring made of an elastomer material such as rubber.

In a preferred embodiment, the threads in the bore of the fitting and the threads on the external surface of the insert are straight threads. Straight threads are used to reduce a wedging force that can be exerted by tapered threads onto the fitting. The wedging force can stress and crack the fitting. The straight threads can be 10° modified square threads, and can have a thread pitch of from about 4 to about 12. Preferably, the thread pitch is about 10 so as to provide sufficient threads for a secure engagement of fitting to insert. The threads in the passageway of the insert are preferably tapered threads to correspond to the tapered threads standard with fire sprinkler heads.

The radial taper of the passageway of the metal insert is greater than zero and less than about 0.1 inch per foot. Preferably the amount of this taper is about 0.075 inch per foot to match the taper of standard sprinkler heads.

To assemble the adapter, the gasket is placed on the internal grooved annulus of the fitting. The threaded bore of the fitting and the external threads of the insert are then engaged by screwing the second opening of the insert into the first end of the fitting until the stop flange prevents further insertion of the insert.

The adapter can be a part of a sprinkler system comprising (a) a plurality of interconnected plastic pipes capable of transporting fluid from a source of a fluid supply, (b) an adapter of the present invention connected to the terminal ends of the plastic pipes, remote from the fluid supply source, and (c) a metallic sprinkler head connected to each adapter by being screwed into the metal insert.

The present invention satisfies the prior art need for an inexpensive adapter to provide an essentially leak-free connection of plastic to metal in a pressurized fluid system such as a fire sprinkler system. The adapter has an easily inserted and replaceable metal insert. Additionally, the adapter's gasket is also replaceable. These characteristics provide a versatile long life adapter that is easily assembled and maintained.

DRAWINGS

These and other features, aspects and advantages of the present invention will become better understood from the accompanying description, the appended claims, and the accompanying drawings where:

DESCRIPTION

The present invention is based on the finding that certain adapters can be used to provide superior connection of plastic to metal in a pressurized fluid system.

Figure 1:
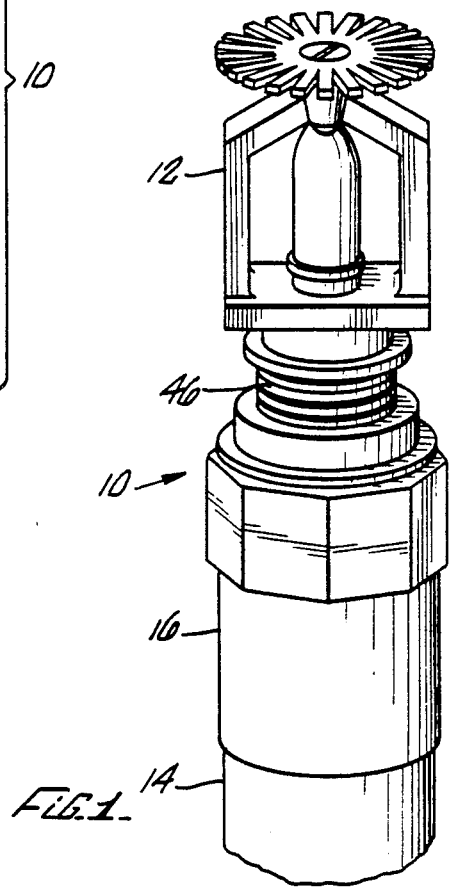
FIG. 1 is a perspective view of an adapter embodying features of the invention shown connected to a sprinkler head.

As shown by FIG. 1, an adapter 10 embodying features of the invention connects a threaded metallic structure, such as a sprinkler head 12, to a plastic pipe 14. The adapter, sprinkler head, and plastic pipe form part of a sprinkler system. The sprinkler system can carry a pressurized fire retardant such as water to various locations within a building. The sprinkler system comprises a plurality of interconnected plastic pipes 14 capable of transporting fluid from the source of a fluid supply (not shown) with the adapters 10 connected to the terminal ends of the plastic pipes 14 remote from the fluid supply source. A metallic sprinkler head 12 is connected to each adapter 10.

Figure 4:
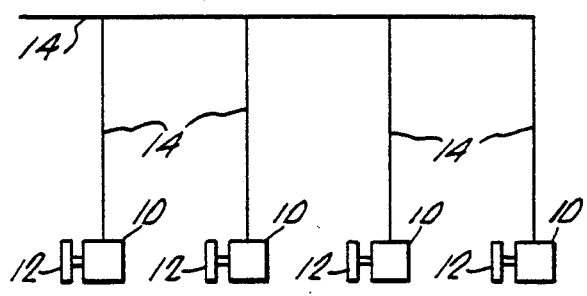
FIG. 4 is a top plan view of a sprinkler system utilizing the adapter of FIG. 1.
Figure 3:
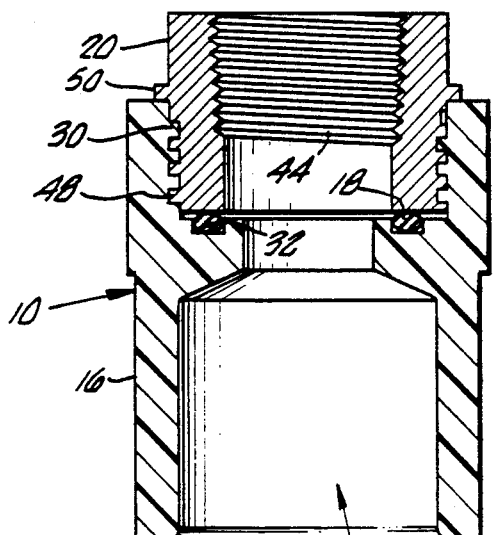
FIG. 3 is a vertical cross sectional view of the adapter shown in FIG. 1.
Figure 2:
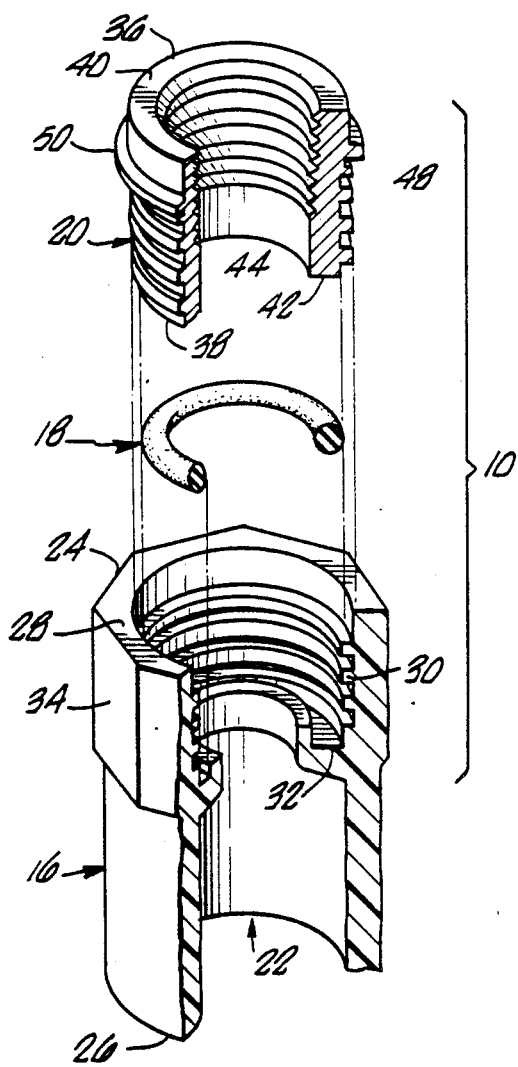
FIG. 2 is an exploded view in partial section of the adapter shown in FIG. 1.

As shown by FIGS. 2 and 3, the adapter 10 comprises a plastic fitting 16, a gasket 18, and a metal insert 20. The plastic fitting 16 has a bore 22 extending axially from a first female end 24 to a second female end 26. The first end 24 has an end surface 28. The first end 24 is adapted for receiving the metal insert 20. The second end 26 is adapted for connection by suitable means, such as by a solvent adhesive, to the plastic pipe 14.

The axial bore 22 of the plastic fitting has threads 30 at the first end 24. The diameter of the threaded bore of the plastic fitting is substantially constant. Thus, the walls of the threaded bore of the fitting do not taper. Additionally, the diameter of the opening at the first end 24 and the diameter of the opening at the second end 26 are substantially equal. Hence, the first end 24 does not terminate in a narrow end surface. The fitting is provided with a grooved annulus 32 for holding the gasket 18. The fitting also has outer circumferential flats 34 for allowing the fitting to be grasped and held by a tool such as an adjuster spanner wrench.

The metal insert 20 has a passageway extending axially from a first female opening 36 and a second male opening 38. The first opening 36 has an end wall 40, while the second opening 38 has an end wall 42. The axial passageway has threads 44 that correspond to the threads 46 of the sprinkler head 12, thereby allowing the sprinkler head to be screwed into the insert. Preferably, the threads 44 in the passageway of the metal insert are tapered threads with a thread pitch of about 14. These characteristics match those of standard fire sprinkler head threads.

The threaded passageway of the metal insert tapers radially inward as shown most clearly by FIG. 3. The amount of radial taper of the threaded passageway of the insert is greater than zero and less than about 0.1 inch per foot. Preferably the taper of the passageway is about 0.075 inch per foot so as to match the taper of the external wall of the standard fire sprinkler head 12.

The metal insert has external threads 48. The external threads 48 of the metal insert correspond to the threads 30 of the plastic fitting so that upon engaging the first end 24 of the plastic fitting with the second opening 38 of the metal insert the insert can be screwed into the fitting. The diameter of the externally threaded metal insert is substantially constant. Thus, the walls of the externally threaded insert do not taper.

The metal insert 20 has a stop flange 50 that acts to prevent further insertion of the insert into the fitting.

The gasket 18 can be an O-ring made of any suitable material including elastomeric materials such as rubber. The gasket is positioned in the grove of the annulus 32 against the end wall 42 of the insert. The gasket serves as a fluid sealant between the fitting and the insert. A suitable O-ring is available from California Sealing Device of 16521 Arminta, Van Nuys, Calif. 91406, as product Buna 117, sold under the trade name "BUNA-O-RING."

The annulus 32 also serves to prevent intrusion of the plastic pipe 14 into the threaded part of the bore 22 of the fitting 16.

The adapter is constructed and assembled so as to minimize stress on the fitting after assembly of the adapter and pressurization of the sprinkler system with fluid. Stress can cause fractures in the fitting resulting in fluid leakage from the fitting.

Stress on the fitting is reduced in several ways. First, after being molded the fitting is allowed to cool to room temperature before insertion of the metal insert. In this manner the fitting releases compression forces that build up during the molding process. Positioning of the insert before the fitting has cooled sufficiently can prevent dissipation of the compression forces.

Second, the fitting and the insert are made to reduce application of a wedging force by the insert onto the fitting. The wedging force is reduced because the threaded bore of the fitting and the externally threaded surface of the insert are both nontapered. Hence, assembly of the insert into the fitting does not result in the insert exerting a wedging force onto the fitting.

Third, tapered threads are preferably not used on the fitting and the external insert surface. Tapered threads are known to exert a wedging force. Thus, in a preferred embodiment, the wedging force is further reduced by the threads 30 and 48 being matching straight threads. Suitable straight threads include those known generally to the art as modified "ACME" screw threads. Most preferably the threads 30 and 48 are 10° modified square threads because such threads result in little if any wedging force and are readily available. Desirably, the straight threads have a thread pitch from about 4 to about 12. A thread pitch below about 4 can result in insufficient threads for a secure engagement of fitting to insert. A thread pitch above about 12 also results in reduced grip because as thread pitch increases thread height decreases. A thread pitch of about 10 has been found suitable.

Fourth, the stop flange acts, when the insert is fully screwed into the plastic fitting, to counteract an expansion force exerted by the insert onto the fitting. The expansion force arises due to the interaction of threads 30 and threads 48 when the insert 20 is bottomed into fitting 16. When the stop flange comes into firm contact with the end surface 28, the expansion force is substantially nullified. By reducing stress upon the fitting in the manner described above, a long term, essentially leak-free connection of plastic to metal can be achieved.

The plastic fitting can be made from any moldable plastic such as vinyl and butylene plastics. The fitting is preferably made of a chlorinated polyvinylchloride plastic because such plastics show both impact resistance and resistance to deformation such as melting, over a wide temperature range. The plastic fitting can be injection molded from a plastic such as the chlorinated polyvinylchloride plastic made by B. F. Goodrich Corporation of 9911 Brecksville Road, Brecksville, Ohio 44141-3247 as the product CPVC Orange, compound 88971-734, trademarked "BLAZEMASTER."

The metal insert can be made of any machinable metal or metal alloy such as brass, stainless steel and aluminum. The insert is preferably made of brass because the standard sprinkler head 12 is usually made of brass. Having both metals with the same composition helps to ensure a matching coefficient of expansion and to reduce galvanic action and ensuing corrosion that can result from prolongated contact of two different metals. A suitable insert can be obtained from De King Screw Products, Inc. 3330 Burton Avenue, Burbank, Calif. 91501 as product FS1-005.

To assemble the adapter 10 of the present invention, the gasket 18 is positioned within the groove of the annulus 32 of the plastic fitting 16. The metal insert 20 is then screwed into the plastic fitting 16 by engaging the threads 48 and the threads 30 until the stop flange 50 comes to rest against the end wall 28 and thereby prevents further insertion of the metal insert. In this position, the end wall 42 presses firmly against the gasket 18.

The adapter can be part of a sprinkler system comprising a plurality of interconnected plastic pipes 14, adapters 10, and metallic sprinkler heads 12. Such a sprinkler system can find application as a fire retardant system in buildings. When made to be part of a fire sprinkler system, the second end of the plastic fitting is constructed in accordance with American Society for Testing Materials (ASTM) specification F439, so as to accommodate the plastic pipe standard to fire sprinkler systems. Similarly, the threaded passageway of the metal insert can be constructed in accordance with National Pipe Thread (NPT) American National Standards Institute (ANSI) specification B1.20.1, so as to accommodate the male end of the standard metallic fire sprinkler head.

When used as part of a fire sprinkler system: the metal insert can be about 0.75" in length, with a passageway diameter of also about 0.75", and an insert external diameter of about 1.125"; the plastic fitting can be about 1.75" in length, with a bore diameter of about 1.125" at the first end of the fitting, a bore diameter of about 1" at the second end of the fitting, and an external fitting diameter of about one inch and three eights of an inch.

Adapters according to the present invention have many advantages including the following:

1. Essentially leak-free connection of plastic to metal in a pressurized fluid system can be achieved.
2. The leak-free integrity of the adapter can be maintained over long usage.
3. The metal insert can be inserted on site by hand.
4. The metal insert is easily replaceable.
5. The gasket is easily replaceable.
6. The adapter can be made relatively inexpensively.

Although the present invention has been described in considerable detail with regard to certain preferred embodiments, other embodiments are possible. For example, the threads and taper of the passageway and of the insert are not restricted to particular configurations. Hence, the adapter can be used in many different pressurized fluid systems requiring a plastic to metal transition such as an agricultural sprinkler system. Therefore the spirit and scope of the appended claims should not be limited to the description of the preferred versions contained herein.

What is claimed is:

1. An adapter comprising:
   (a) a plastic fitting having a bore extending from a first end to a second end of the fitting, a first part of the bore proximate to the first end being threaded and a second part of the bore proximate to the second end being unthreaded, the diameter of the threaded bore being substantially constant, the second end of the fitting being sized for receiving a plastic pipe, the fitting comprising means disposed in the bore of the fitting between the threaded and unthreaded parts of the bore for preventing intrusion of the plastic pipe into the threaded part of the bore;
   (b) a metal insert having,
      (i) a passageway extending from a first opening to a second opening of the insert, at least part of the passageway being threaded, the threaded passageway tapering inwardly in a direction from the first to the second opening,
      (ii) at least part of the external surface of the insert being threaded with threads corresponding to the threads of the fitting, the diameter of the externally threaded insert being substantially constant, and
      (iii) a stop flange adjacent the external threads of the insert; and
   (c) a gasket disposed in the bore of the fitting between an end wall of the second opening of the insert and the fitting, wherein the threaded bore of the fitting and the external threads of the insert are engaged by screwing the second opening of the insert into the first end of the fitting until the stop flange prevents further insertion of the insert.

2. The adapter of claim 1 wherein the threads in the bore of the fitting and the threads on the external surface of the insert are straight threads.

3. The adapter of claim 1 wherein the threads in the passageway of the insert are tapered threads.

4. The adapter of claim 1 wherein the threads of the fitting and the external threads of the insert are 10° modified square threads.

5. The adapter of claim 1 wherein the pitch of the threads of the fitting and the external threads of the insert is from about 4 to about 12.

6. The adapter of claim 5 wherein the pitch of the threads of the fitting and the external threads of the insert is about 10.

7. The adapter of claim I wherein the taper of the passageway of the metal insert is greater than zero and less than about 0.1 inch per foot.

8. The adapter of claim 7 wherein the taper is about 0.075 inch per foot.

9. The adapter of claim 2 wherein the gasket is an O-ring made of an elastomer material.

10. The adapter of claim 1 further comprising a sprinkler head that is threaded into the first opening of the passageway of the insert.

11. An adapter for providing a leak-free connection in a pressurized fluid system, comprising:
    (a) a plastic fitting having a bore extending from a first end to a second end of the fitting, a first part of the bore proximate to the first end being threaded with straight threads and a second part of the bore proximate to the second end being unthreaded, the diameter of the threaded bore being substantially constant, the second end of the fitting being sized for receiving a plastic pipe, the fitting comprising means disposed in the bore of the fitting between the threaded and unthreaded parts of the bore for preventing intrusion of the plastic pipe into the threaded part of the bore;
    (b) a metal insert having a passageway extending from a first opening to a second opening of the insert, at least part of the passageway being threaded with tapered threads, the passageway tapering inwardly in an amount of taper greater than zero and less than about 0.1 inch per foot in a direction from the first to the second opening, at least part of the external surface of the insert being threaded with straight threads corresponding to the straight threads of the fitting, the diameter of the externally threaded insert being substantially constant, and a stop flange adjacent the external threads of the insert;
    (c) an elastomer O-ring disposed between an end wall of the second end of the insert and the fitting,
    wherein the straight threads of the fitting and the straight threads of the insert are engage by screwing the second opening of the insert into the first end of the fitting until the stop flange prevents further insertion.

12. The adapter of claim 11 further comprising a sprinkler head that is threaded into the first opening of the passageway of the insert.

13. A sprinkler system comprising:
    (a) a plurality of interconnected plastic pipes capable of transporting fluid from a source of a fluid supply;
    (b) adapters connected to the terminal ends of the plastic pipes remote from the fluid supply source, each adapter comprising,
        (i) a plastic fitting having a bore extending from a first end to a second end of the fitting, a first part of the bore being threaded and a second part of the bore proximate to the second end being unthreaded, the diameter of the threaded bore being substantially constant, the second end of the fitting being sized for receiving a plastic pipe, the fitting comprising means disposed in the bore of the fitting between the threaded and unthreaded parts of the bore for preventing intrusion of the plastic pipe into the threaded part of the bore;
        (ii) a metal insert having a passageway extending from a first opening to a second opening of the insert, at least part of the passageway being threaded, the threaded passageway tapering inwardly in a direction from the first to the second opening, at least part of the external surface of the insert also threaded with threads corresponding to the threads of the fitting, the diameter of the externally threaded insert being substantially constant, and a stop flange adjacent the external threads of the insert, and
        (iii) a gasket disposed in the bore of the fitting between an end wall of the second opening of the insert and the fitting,
    wherein the threaded bore of the fitting and the external threads of the insert are engaged by screwing the second opening of the insert into the first end of the fitting until the stop flange prevents further insertion of the insert; and
    (c) a metallic sprinkler head connected to each adapter by being screwed into the first opening of the passageway of the metal insert.

* * * * *